Feb. 12, 1952 R. E. PIERCE 2,585,833
TRAP
Filed Dec. 27, 1949 2 SHEETS—SHEET 1
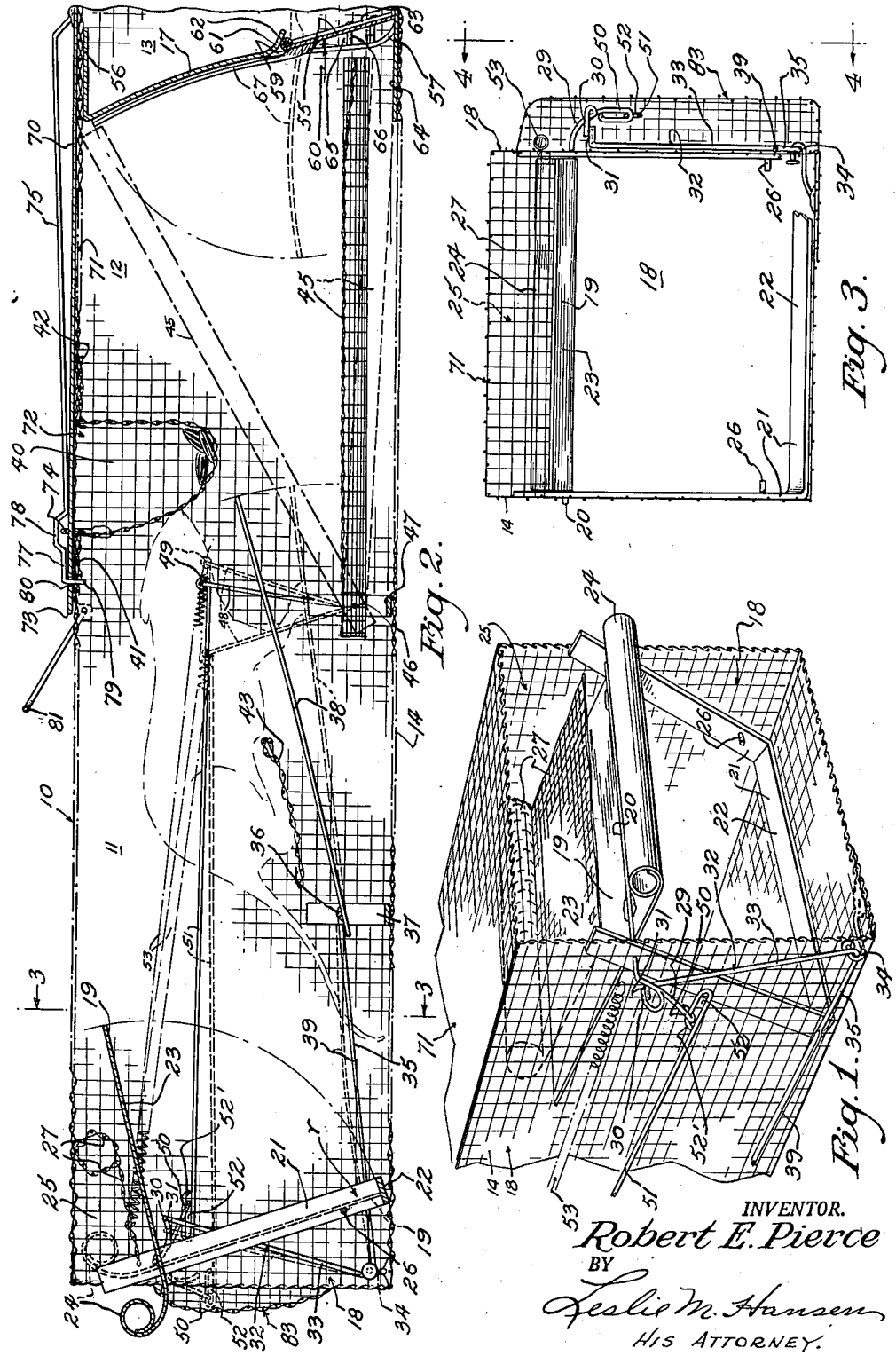
INVENTOR.
Robert E. Pierce
BY
Leslie M. Hansen
HIS ATTORNEY.

Feb. 12, 1952 R. E. PIERCE 2,585,833
TRAP
Filed Dec. 27, 1949 2 SHEETS—SHEET 2
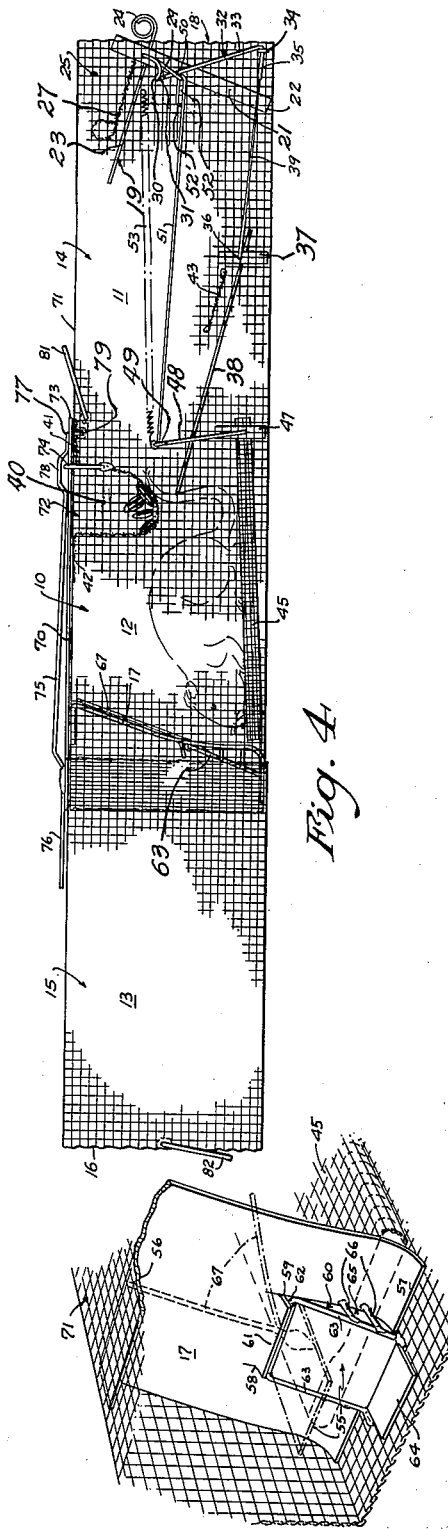
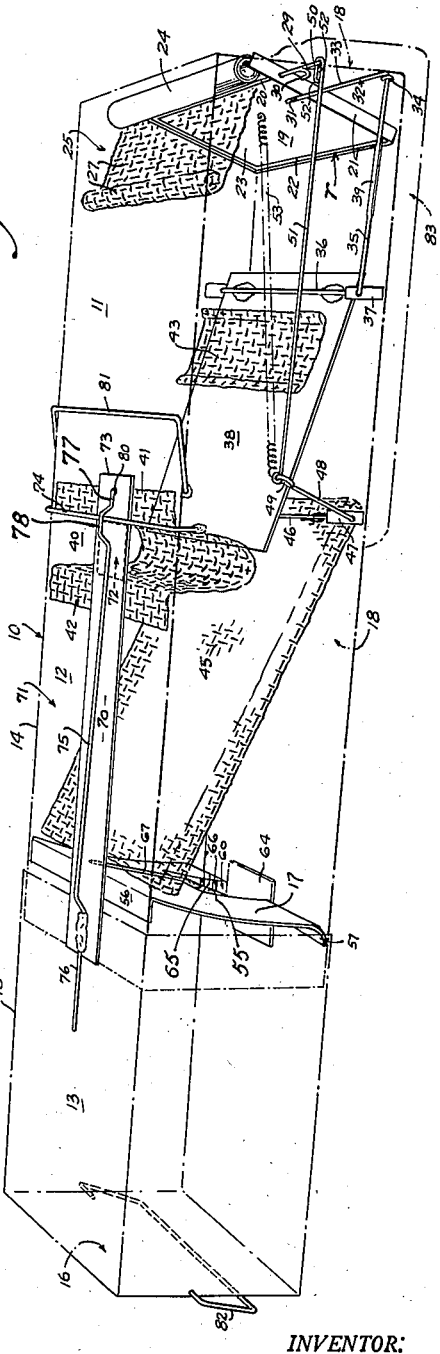
INVENTOR:
Robert E. Pierce
BY
Leslie M. Hansen
HIS ATTORNEY.

Patented Feb. 12, 1952

2,585,833

UNITED STATES PATENT OFFICE 2,585,833

TRAP

Robert E. Pierce, San Jose, Calif.

Application December 27, 1949, Serial No. 135,199

11 Claims. (Cl. 43—76)

1

This invention relates to animal traps and more particularly to certain novel improvements in self setting traps for catching rodents and the like.

While numerous traps of the resetting type have been devised and patented by others, this invention relates to an improved trap of this character in which the various parts and actuating mechanisms are of a more simple construction and so designed as to assure against entrapped rodents freeing themselves from the confines of my trap.

It is an object of this invention to provide a self setting trap which is simple in construction, easily assembled, and economical in manufacture.

Another object is to provide an extensible housing for a self setting animal trap so as to accommodate the same for various locations of use as well as to conserve space while storing or packaging the same.

Another object is to provide a novel type of trip mechanism in which a leaf spring employed forms an integral part of the door holding feature of my trap structure.

Other objects and advantages of the present invention will become apparent from the following specification in the light of the drawings in which:

Fig. 1 is a fragmentary perspective view of the entrance, gate and setting mechanism of my trap.

Fig. 2 is a longitudinal section through the entrance vestibule and intermediate chamber of my trap structure.

Fig. 3 is a section of Fig. 2 looking in the direction of arrows 3—3 thereof.

Fig. 4 is a side elevation of my trap as seen from line 4—4 in Fig. 3.

Fig. 5 is a fragmentary perspective view of a partition and trap door between the intermediate and confining chambers of my trap.

Fig. 6 is a perspective view of my trap showing the interior parts in their relative positions with respect to each other within the main body of the trap which is shown in phantom.

The trap comprises a main body 10 divided into three compartments such as an entrance vestibule 11, an intermediate chamber 12 and a compound or confining chamber 13. The main body 10 is further divided into two sections 14 and 15 in which the section 15 telescopingly fits over the section 14 so as to be slidable relative thereto.

Each of the sections 14 and 15 is preferably constructed of ¼ inch mesh wire of sufficient gauge as to assure against break down of the wire strands by gnawing of the animals in the

2 trap. The rear section 15 which fits over the fore section 14 encloses the aforementioned confining chamber 13 and therefore has its far end 16 closed by wire mesh to prevent the confined animal from escaping. The section 14 constitutes an open ended wire mesh box having top, bottom and sides, there being a partition 17 adjacent the open rear end of the section 14 which separates the intermediate chamber 12 from the confining chamber 13. The opposite open end 18 of the section 14 as best illustrated in Figs. 1 and 3 constitutes the entrance to the trap provided with a trap door 19 which is normally held open but is adapted to be tripped into closed position. The door 19 is secured to a rod 20 which extends through the upper ends of the arms of a U-shaped frame 21 having its bight 22 engaging the bottom of the section 14. This frame 21 is angularly disposed with its arms secured to the sides of section 14 by solder or the like in a manner to position the rod 20 just inside the entrance opening 18 and the bight 22 of the frame further inward therefrom. The door 19 is brazed or soldered to the rod 20 so as to turn therewith and the major panel 23 of the door is counterbalanced by a rolled portion 24 of the material from which the door is made. This roll 24 is adapted to swing into the upper section 25 of the entry way 18 when the door is closed and the major panel rests against a pair of pegs 26 on the arms of the frame.

From the foregoing it will be apparent that the door 19 while in closed position, see dotted lines Fig. 2, is urged into closed position by gravity and that the roll 24 being over center of the rod 20 further tends to maintain the door in closed position. In this manner, and in view of the deep recess r of the frame aroung the major panel 23 of the door it will be difficult for a trapped animal to pry the door open from within the vestibule 11.

In addition to the foregoing it will be noted that a wire mesh roll and screen 27 is secured to the side and top walls of the vestibule in the region of the upper section 25 of the entry way, i. e., above the rod 20 on which the door swings. Consequently, it will be impossible for an animal to touch the roll 24 and thereby swing the door open from within the vestibule.

Referring now to Fig. 1, it will be seen that the rod 20 extends from the one side wall 28 of the section 14 and is then bent downwardly to provide an arm 29. This arm has a trip finger 30 secured thereto and bent backwardly therefrom toward the wall 28.

The trip finger 30 is adapted to seat itself upon the trip ledge on the top edge 31 of a trip lever 32 which is of triangular cross section. Consequently, when the door 19 is initially set by hand into the position shown in Figs. 1, 2 and 3 the trip finger 30 engages one side edge of the triangular shaped lever 32 and ultimately seats itself upon the top ledge 31 thereof to hold the door 19 in open position.

The trip lever 32 comprises an arm 33 which extends downwardly along the side wall 28 of the trap and through an eye 34 closely adjacent the intersection of the side wall 28 with the bottom wall and open front 18 of the trap. From the eye 34 the trip lever extends rearwardly as at 35 a substantial distance and then is bent inwardly as at 36 so as to extend transversely of the trap. The transverse portion 36 of the trip lever extends through upturned legs of a U strap 37 and has a treadle plate 38 secured to it so as to effect a turning of the transverse portion of the lever when the treadle is weighed down by an animal treading upon the latter.

It will be noted that the rearwardly extending portion 35 of the trip lever is flattened at top and bottom to form a leaf spring 39 which is sensitive to any turning of the transverse portion 36 by reason of weight on the treadle plate 38. Consequently, when an animal steps upon the plate 38 in the manner illustrated in Fig. 2, the leaf spring 39 is flexed into substantially the dotted line position shown in Fig. 2 and the arm 33 of lever 32 is thereby swung forwardly slightly but sufficient to unseat the trip finger 30 whereupon the door 19 falls into closed position under its own weight.

As indicated in Fig. 2 the animal is enticed into entering the vestibule 11 by the presence of bait such as the sunflower seeds in the bin 40 suspended from the top of the section 14 of the trap and just in advance of the free end of treadle plate 38. This bin 40 is ¼ inch wire mesh extending completely across the box like section 14 and has its fore and aft ends 41 and 42 properly secured as by solder to the top of the section 14, the side edges of the bin 40 also being suitably secured to the respective side walls of the section 14.

From the foregoing it will be apparent that the section 14 is rigidified transversely by the wire bin 40. It is further rigidified transversely by a fixed wire mesh 43 just above the treadle plate 38 slightly forward of the axis of swing of the same. This tread 43 serves to support an animal as shown so that the animal will not trip the door holding mechanism, previously explained, before the animal is well into the vestibule 11.

The means for resetting the door of the present trap comprises a second or resetting treadle 45 in the form of a wire screen panel which is secured at its forward end on a transverse bar 46. This bar 46 is supported for pivotal movement in upturned ends of a U strap 47 secured to the bottom of the section 14, one end 48 of bar 46 extending beyond the side wall 28 of the trap and being bent upwardly to terminate in an eye 49 at substantially the same horizontal plane as the free end 50 of the downwardly extending arm 29 of the rod 20 to which the door 19 is secured. The free end 50 of arm 29 is provided with an eye which is connected to the eye 49 by a connecting rod 51 so that any movement of the arm 49 and treadle 45 is transmitted to the door 19.

The one end of connecting rod 51 is pivotally connected to the eye 49 but the opposite end of rod 51 is provided with an elongated eye 52 which fits the eye in the free end 50 of arm 29 and allows a sufficient play between the movement of treadle 45 and door 19 to permit freedom of movement of the arm 29 when the trip finger 30 is unseated by movement of the trip lever 32 from beneath it. In addition to the foregoing, the eye 49 is connected to one end of a tension spring 53 the opposite end of which is anchored to the side wall 28 of the trap in the region of the upper section 25 adjacent the entry way of section 14. This spring 53 tends to pull the arm 48 forwardly and to urge the treadle 45 toward the inclined position as seen in dot-dash lines in Fig. 2. This puts a thrust on connecting rod 51, it being noted that the tail 52' of the eye 52 normally engages the free end 50 of arm 29 so that a certain portion of the tension of spring 53 is acting upon the arm 29. Consequently, when the trip lever 32 is actuated by an animal on the treadle 38 the spring 53 gives the arm 50 an initial push to quickly close the door 19, the balance of the elongated eye 52 allowing freedom of movement of the lever arm 29.

The partition 17 as shown in section in Fig. 2, is provided with a trap door 55 through which an animal can enter the confining chamber 13. This partition 17 is arcuate in conformity with the swing of the free end of the wire mesh treadle 45. The upper end 56 of partition 17 is secured by soldering or the like to the wire mesh top of the section 14. The lower edge 57 of the partition is curved rearwardly and is secured to the bottom of the section 14, see Fig. 5. The partition 17 is cut back from its bottom along two parallel lines 58—59 to provide an opening 60, a portion of the strip between such lines being removed and the remaining portion 61 being curved upwardly to form a guard.

The door 55 swings on the bight portion 62 of a U rod, the legs 63 of which extend substantially tangent to the curvature of the partition 17. A floor plate 64 extends through the opening 60 and has the ends of the legs 63 of the U rod secured thereto. The door 55 is a full panel having its lower edge adapted to engage the floor plate 64 just forwardly the point of connection of the legs 63 therewith, it being noted that the side edges of door 55 are well guarded by the curved surfaces of the legs 63 so that an animal cannot pry the door 55 open. In addition to the foregoing, it will be noted that the gaps 65 between the legs 63 and the partition 17 are barred by horizontal strips of heavy rod 66 welded at their ends to the respective legs and partition 17. This barred gap at the forward side of the door 55 tends to give an animal within the intermediate chamber 12 the impression of a means of escape whereupon the animal will nudge the door 55 and find that it will open in the direction of the confining chamber 13.

The door 55 is provided with a wire arm 67 which is soldered to the forward side of the door and bent arcuately to extend in substantial parallelism between the partition 17 and the path of movement of the rearward, free, end of the wiremesh treadle 45. It is therefore apparent that the door 55 cannot be opened while the treadle is disposed in raised position by action of the spring 53 and the arm 48 extending upwardly from the axis provided by the transverse bar 46 with which the treadle 45 swings.

Consequently, it is only when an animal weighs the treadle 45 down into the position shown in Fig. 4 that the door 55 is free to open or that the animal can nudge the door 55 to pass through the opening 60. Once the animal enters the confining chamber 13 the treadle 45 is released for return movement to raised position by the spring 53 and simultaneously the free end of treadle 45 actuates the wire arm 67 to positively force the door 55 into closed position.

In addition to releasing the door 55 for opening movement, the weight of the animal on the treadle 45 positively swings the arm 48 into its extreme rearmost position, Fig. 4, against the action of the spring 53. This movement of arm 48 effects a rearward pull upon the connecting rod 51 exerting a rearward pull upon the free end 50 of the downwardly extending arm 29 of the rod 20 upon which the entrance door 19 is secured. In this manner the trip finger 30 carried by the arm 29 is urged past the extended trip ledge 31 of the trip lever 32 and the entrance door 19 is again reset in open position.

Obviously, if the animal on treadle 45 attempts to get back into the vestibule 11, the bait bin 40 makes it impossible for the animal to jump over the now raised end of the treadle plate 38. Consequently, if the animal claws at the upraised treadle plate 38 or otherwise depresses the same, the leaf spring 39 will thereby be flexed and the lever arm 32 shifted out of supporting relation with respect to the trip finger 30 whereupon the door 19 will drop into closed position before the animal can make its exit by way of the entrance opening 18.

In connection with the feature of the telescoping body of the trap it will be noted that the section 15 can be slid all the way onto the section 14 leaving the trap of a length comparable to the length of the vestibule and intermediate chambers only. This is advantageous from the standpoint of storage as well as packaging of the trap. Moreover, when several animals are entrapped in the confining chamber 13, that end of the trap can be submerged in a body of water and thereafter the contents removed by separation of the sections 14 and 15.

It should be noted in Figs. 2, 4 and 6 that an elongated closure member 70 is secured to the upper surface of the section 15 so as to extend over the upper surface 71 of the section 14. This surface 71, has an opening 72 therein above the bait bin 40 for replenishing the same. This opening 72 is slightly narrower than the width of the closure member 70 and the latter overlies the opening when the section 15 is in its extreme extended position with respect to the section 14.

The free end 73 of the closure member 70 extends slightly beyond the forward margin of the opening 72 and beneath a cross bar 74 disposed at that position above the top surface of the section 14. Means is provided for latching the sections 14 and 15 together in the form of a spring wire 75 secured by welding or soldering to the portion of the closure member secured to the section 15. Since the section 15 to which the closure member 70 is secured is wire mesh and therefore easily bent, the base end 76 of spring 75 extends over the upper surface of the section 15 sufficiently to form a bearing for the spring 75 to thereby resist upward bending of the latter and the closure member 70. The opposite end of spring 75 is bowed upwardly and tends to bear at its free end 77 against the closure member 70. This free end has a handle 78 formed therein for facilitating raising of the downturned keeper end 79 of the spring out of engagement with the meshwork material from which the body of the trap is constructed. This keeper 79 extends through a hole 80 formed in the closure member 70 so as to enter between cross wires of the meshwork of the body 10 for latching the two sections 14 and 15 together.

The trap may be carried by either or both handles 81 or 82 at the top and rear end respectively of the main body 10.

The trip mechanism 29, 30, 32, 39, 48, 51 and 53 of the trap is preferably enclosed by a suitable wire mesh guard 83 so as to prevent animals outside the trap tripping the same. This guard further shields the leaf spring 39 and trip lever and ledge against accidental displacement or bending so as to maintain them as sensitive as possible to the action of the treadles as hereinbefore explained.

While I have described the various features of my improved animal trap in detail it will be apparent that they are susceptible to variations, modifications and alterations without departing from the spirit of my invention. I therefore desire to avail myself of all variations, modifications and alterations coming within the purview of the appended claims.

What I claim as new and desire to protect by Letters Patent is:

1. An animal trap, comprising a tubular rectangular box having one end closed and a counterbalanced door pivotally mounted at its opposite open entrance end, and a partition arranged at an intermediate position to form a vestibule and a chamber in said box, said partition being cut to provide a restricted opening leading into a rearmost chamber in said box, a bait bin suspended from the top of said box and transversely thereof intermediate said partition and the open entrance end of said box, said partition being arcuate of configuration, a treadle pivotally mounted in said intermediate chamber with its free end disposed to travel in parallelism with the arcuate configuration of said partition, a treadle plate pivotally mounted in said vestibule with its free end disposed in the region of the lower margin of said bait bin, said counterbalanced door having an arm extending therefrom beyond one side wall of said box and provided with a trip finger, and a trip lever associated with said treadle plate and comprising a rod extending therefrom outside said one wall of said box parallel to the same and through an anchor eye adjacent said entrance opening, said rod having an upwardly extending lever provided with a trip ledge adapted to underlie said trip finger of the counterbalanced door for holding the same in an open position, said portion of said rod extending parallel to said one wall of said box being formed to provide a leaf spring adapted to flex upon downward movement of said treadle plate for shifting said upwardly extending lever of said rod and the trip ledge thereof out of supporting relation with respect to said trip finger.

2. In an animal trap of the type having a tubular like body of rectangular cross section divided into a vestibule, intermediate and confining chambers, a bait bin suspended from the top of said body and transversely thereof at the juncture of the vestibule and intermediate chamber, a treadle pivotally mounted beneath said bait bin and extending toward the juncture of the intermediate and confining chambers, a partition at said last named juncture being of arcuate configuration to conform to the path of movement of the free end of said treadle, a counterbalanced door pivotally mounted at the open entrance of said body and having a lever arm swingable therewith and having a free end disposed exteriorly of said body, a treadle plate pivotally mounted midway of said vestibule and having its free end disposed in the zone of the lower end of said bait bin, said treadle plate having a leaf spring operatively connectel thereto and extending exteriorly of one side wall of said body and through an anchor eye secured to said side wall so as to extend upwardly into the region of the free end of said lever arm, said lever arm having a trip finger thereon, a trip ledge on the upper end of said upwardly extended portion of said leaf spring to provide a seat for said trip finger for holding the door associated with the latter in open position and adapted to unseat said trip finger when said leaf spring is flexed by the influence of a weight disposed on said treadle plate, and an arm movable with said first named treadle, said arm having means for connecting the same with the free end of said lever arm for swinging the latter into a position in which its trip finger seats on said trip ledge when the first named treadle is depressed by a weight thereon.

3. An animal trap comprising an elongated body closed at one end and open at the other end, a counterbalanced door pivotally mounted adjacent the open end of said body, said door having a lever arm swingable therewith and extending exteriorly of said body, a treadle plate within said body beyond said door and mounted on a rod for pivotal movement therewith, said rod extending exteriorly of said body and being bent horizontally toward said one open end thereof, and an anchor eye for receiving said rod in the region below said lever arm, said rod having a portion bent upwardly and terminating in a trip ledge, said lever arm having a trip finger thereon adapted to seat on said trip ledge for holding said door in open position, the horizontal portion of said rod being adapted to be bowed when an object weighs said treadle plate down whereby the upwardly bent portion of said rod is swung slightly to shift the trip ledge thereon out of supporting relation with said trip finger.

4. An animal trap comprising an elongated body closed at one end and open at the other end, a counterbalanced door pivotally mounted adjacent the open end of said body, said door having a lever arm swingable therewith and extending exteriorly of said body, a treadle plate within said body beyond said door and mounted on a rod for pivotal movement therewith, said rod extending exteriorly of said body and being bent horizontally toward said one open end thereof, an anchor eye for receiving said rod in the region below said lever arm, said rod having a portion bent upwardly and terminating in a trip ledge, said lever arm having a trip finger thereon adapted to seat on said trip ledge for holding said door in open position, the horizontal portion of said rod being adapted to be bowed when an object weighs said treadle plate down whereby the upwardly bent portion of said rod is swung slightly to shift the trip ledge thereon out of supporting relation with said trip finger. a resetting treadle disposed within said body to receive an object passing from the free end of said treadle plate, a shaft secured to said resetting treadle for movement therewith and pivotally mounted in the side walls of said body with one end of said shaft extending exteriorly of said body to provide a resetting arm, means for yieldably holding said resetting arm and resetting treadle in object receiving position, and a connecting rod between said resetting arm and said lever arm for returning the latter and said door into open position wherein said trip finger is seated on said trip ledge when an object weighs said resetting treadle down.

5. An animal trap comprising an elongated body closed at one end and open at the other end, a counterbalanced door pivotally mounted adjacent the open end of said body, said door having a lever arm swingable therewith and extending exteriorly of one side wall of said body, a treadle plate pivotally mounted within said body just beyond the arc of swing of said door and having a leaf spring operatively associated therewith and extending exteriorly of said one side wall of said body through an anchor eye in the region below said lever arm, said leaf spring having a rod portion extending upwardly from said anchor eye and provided with a trip ledge at its upper end, and a trip finger on said lever arm adapted to rest on said trip ledge for holding said door in open position, said leaf spring being effected to assume a bowed condition when the weight of an object is on said treadle plate to thereby shift said rod portion of said leaf spring out of normal position whereby to remove said trip ledge from supporting position beneath said trip finger and thereby release said door for movement into closed position.

6. An animal trap comprising an elongated body closed at one end and open at the other end, a counterbalanced door pivotally mounted adjacent the open end of said body, said door having a lever arm swingable therewith and extending exteriorly of one side wall of said body, a treadle plate pivotally mounted within said body just beyond the arc of swing of said door and having a leaf spring operatively associated therewith and extending exteriorly of said one side wall of said body through an anchor eye in the region below said lever arm, said leaf spring having a rod portion extending upwardly from said anchor eye and provided with a trip ledge at its upper end, a trip finger on said lever arm adapted to rest on said trip ledge for holding said door in open position, said leaf spring being effected to assume a bowed condition when the weight of an object is on said treadle plate to thereby shift said rod portion of said leaf spring out of normal position whereby to remove said trip ledge from supporting position beneath said trip finger and thereby release said door for movement into closed position, said lever arm having a resetting eye, a resetting treadle pivotally mounted within said body adjacent the free end of said treadle plate and having a resetting arm extending from said one side wall of said body for swinging movement with said resetting treadle, and a connecting rod between said resetting arm and the resetting eye on said lever arm for pulling the latter and said trip finger thereof into seating relation with the trip ledge on the rod portion of said leaf spring when the object moves off of said treadle plate and onto said resetting treadle.

7. An animal trap comprising a tube-like body having open ends, a compound of like shape closed at one end and open at the other for telescoping relation with one open end of said body, a door pivotally mounted adjacent the other open end of said body for gravity movement into closed position, said door having a lever arm swingable therewith disposed exteriorly of said body and provided with a trip finger, a treadle plate within said body and having a fore end closest to said door and its rear end free, a pivot rod secured to the fore end of said treadle plate pivotally mounted in said body and having an extension disposed exteriorly of said body, said extension having a horizontal portion extending back to the region below said lever arm and a vertical portion extending upwardly toward the latter and provided with a trip ledge adapted to receive said trip finger to support said door in open position, an anchor bar for holding said extension down at the juncture of its horizontal and vertical portions whereby to bow said horizontal portion when said treadle plate is weighed down to effect shifting of the vertical portion and trip ledge from beneath said trip finger, a resetting treadle within said body having a free rear end, a shaft secured to the fore end of said resetting treadle and pivotally mounted in the region below the free end of said treadle plate, said shaft having a resetting arm extending upwardly exteriorly of said body, a partition at the opposite open end of said body of arcuate configuration substantially parallel to the arc of movement of the free end of said resetting treadle adjacent the same, a one way door in said partition having a wire arm extending upwardly therefrom between said partition and the arc of movement of the free end of said resetting treadle for holding said one way door in closed position except when said resetting treadle is depressed, spring means acting on said resetting arm for raising the resetting treadle, and a connecting rod between said resetting arm and lever arm for pulling the latter into a position where its trip finger rests on said trip ledge when said resetting treadle is depressed.

8. An animal trap comprising an open ended tube-like body, a closure removably secured to one open end of said body a door pivotally mounted adjacent the other open end of said body for movement by gravity into closed position, a lever arm swingable with said door and having a trip finger extending exteriorly of said body, means inside said body actuated by the weight of an object thereon, a leaf spring having one of its ends connected to said weight actuated means and its opposite end extending exteriorly of said body, means for anchoring the opposite end of said leaf spring whereby the latter is bowed under the influence of a weight on said weight actuated means, and a trip ledge connected to said leaf spring and normally disposed to support said trip finger for holding said door in opened position and adapted to shift out of said supporting position when said leaf spring is bowed as aforesaid.

9. An animal trap comprising an open ended tube-like body, an enclosure adapted to receive one end of said body for closing the opening therein, a door pivotally mounted adjacent to the other open end of said body for movement by gravity into closed position, a lever arm swingable with said door and having a trip finger extending exteriorly of said body, means inside said body actuated by the weight of an object thereon, a leaf spring having one of its ends connected to said weight actuated means and its opposite end extending exteriorly of said body, means for anchoring the opposite end of said leaf spring whereby the latter is bowed under the influence of a weight on said weight actuated means, a trip ledge connected to said leaf spring and normally disposed to support said trip finger for holding said door in opened position and adapted to shift out of said supporting position when said leaf spring is bowed as aforesaid, resetting means actuated by the weight of an object thereon, lever means connected to said resetting means, a spring for holding said lever means and resetting means in a normally raised position, and a connecting rod between said lever means and said lever arm for pulling the latter into a position to seat said trip finger upon said trip ledge.

10. An animal trap comprising an open ended tube-like body, a door pivotally mounted adjacent one end of said body for movement by gravity into closed position, a lever arm swingable with said door and having a trip finger extending exteriorly of said body, means inside said body actuated by the weight of an object thereon, a leaf spring having one end connected to said weight actuated means and its opposite end extending exteriorly of said body, means for anchoring the opposite end of said leaf spring whereby the latter is bowed under the influence of a weight on said weight actuated means, a trip ledge connected to said leaf spring and normally disposed to support said trip finger for holding said door in opened position and adapted to shift out of said supporting position when said leaf spring is bowed as aforesaid, a resetting treadle pivotally mounted within said body to receive an object passing from said weight actuated means, a lever means operatively connected to said resetting treadle for movement therewith, link means between said lever means and lever arm for effecting movement of said trip finger on the latter into position to be supported on said trip ledge, a partition arcuately curved to lie in parallelism with the arc of swing of the free end of said resetting treadle, said partition having an opening through which an object can pass, a one way door pivotally mounted in said opening and having a wire arm extending into the space between said partition and the free end of said resetting treadle whereby the latter holds said one way door against opening except when said resetting treadle is depressed, a tube-like cage having one end closed and its opposite open end telescopically connected to said body adjacent said partition, and means for latching said cage to said body in various positions of adjustment 11. An animal trap comprising an open ended body, an animal confining compound having an open end secured in communication with one open end of said body, a counterbalanced door pivotally mounted adjacent the other open end of said body, said door having a lever arm swingable therewith and extending exteriorly of said body, a treadle plate within said body beyond said door and mounted on a rod for pivotal movement therewith, said rod extending exteriorly of said body and being bent horizontally toward said other open end thereof, an anchor eye for receiving said rod in the region below said lever arm, said rod having a portion bent upwardly and terminating in a trip ledge, said lever arm having a trip finger thereon adapted to seat on said trip ledge for holding said door in open position, the horizontal portion of said rod being adapted to be bowed when an object weighs said treadle plate down whereby the upwardly bent portion of said rod is swung slightly to shift the trip ledge thereon out of supporting relation with said trip finger, a resetting treadle disposed within said body to receive an object passing from the free end of said treadle plate, a shaft secured to said resetting treadle for movement therewith and pivotally mounted in the side walls of said body with one end of said shaft extending exteriorly of said body to provide a resetting arm, a spring for yieldably holding said resetting arm and resetting treadle in object receiving position, and a connecting rod between said resetting arm and said lever arm for returning the latter and said door into open position wherein said trip finger is seated on said trip ledge when an object weighs said resetting treadle down, said connecting rod being effected by said spring to yieldingly bear against said lever arm for initially urging the door swingable therewith toward closed position when said trip ledge is swung out of supporting relation with respect to said trip finger.

ROBERT E. PIERCE.

REFERENCES CITED

The following references are of record in the file of this patent:

UNITED STATES PATENTS

| Number | Name | Date |
|---|---|---|
| 676,623 | Hand | June 18, 1901 |
| 1,258,011 | James | Mar. 5, 1918 |
| 1,267,391 | Ellison | May 28, 1918 |